Jan. 30, 1951     E. F. STEINHOFF     2,539,873
METHOD OF MAKING BATTERY CONNECTIONS
Filed Jan. 30, 1947
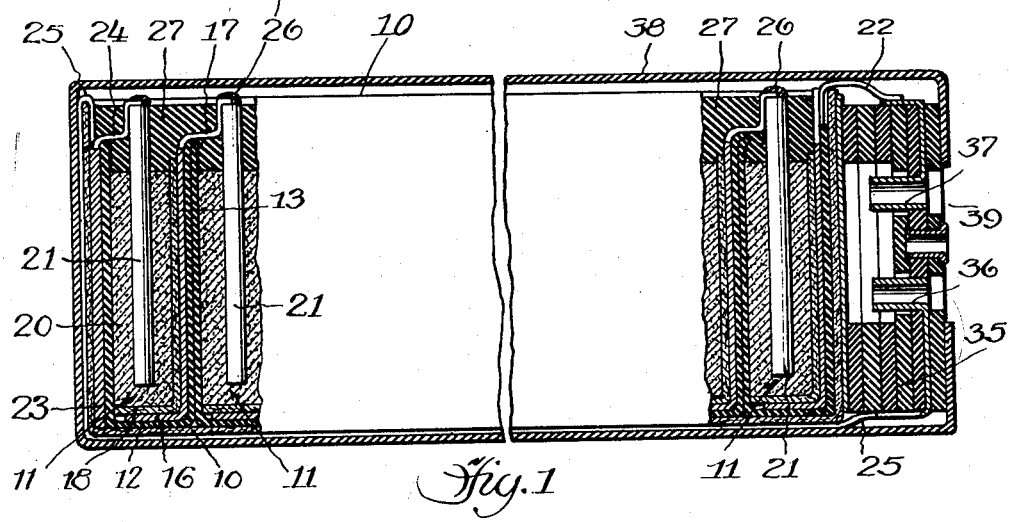
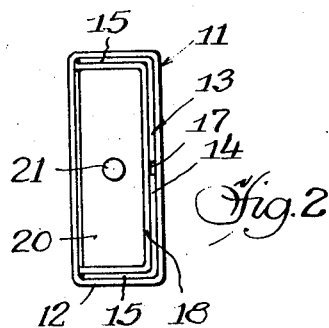
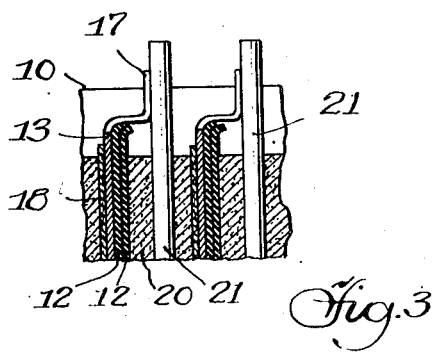
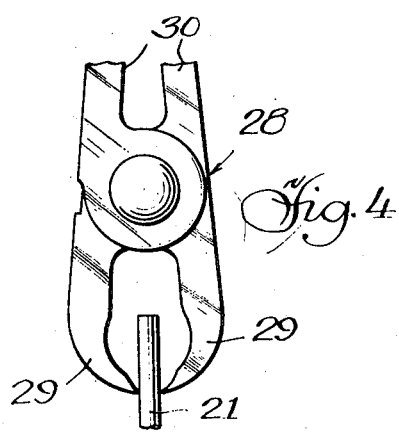
INVENTOR.
Ernest F. Steinhoff,
BY Tesch and Darbo
Attys.

Patented Jan. 30, 1951

2,539,873

UNITED STATES PATENT OFFICE 2,539,873

METHOD OF MAKING BATTERY CONNECTIONS

Ernest F. Steinhoff, Freeport, Ill., assignor, by mesne assignments, to Burgess Battery Company, Freeport, Ill., a corporation of Delaware Application January 30, 1947, Serial No. 725,197

4 Claims. (Cl. 136—175)

This invention relates to multiple cell batteries and the method of making the same. In particular, it relates to an improved method of connecting the cells together in which a metal spraying operation is used instead of the usual soldering operation.

In the making of multiple cell batteries, it has been common practice to form the intercell connections by a soldering operation in which the positive terminal of one cell is soldered to the negative terminal of the adjacent cell, or a separate connecting wire is arranged between such terminals and soldered to them to form the intercell connector.

In accordance with the present invention, it has been discovered that the intercell connections can be made satisfactorily by a metal spraying operation and that such method of making the connections has advantages, the chief of which are that the connections can be made more rapidly, the cost of some of the battery parts is less, and the testing of the cells is facilitated. The connections made by the spraying process have been found to be satisfactorily conductive and capable of withstanding all of the handling and use to which the batteries are normally put.

Accordingly, it is the object of the invention to provide an improved method of forming the intercell connections by a metal spraying operation.

In the drawing:

Fig. 1 is an elevational view, partly in section, of the battery of the invention, employing the sprayed metal connections;

Fig. 2 is a plan view of one of the cells of the battery with the top sealing composition removed;

Fig. 3 is a sectional elevational view of a fragment of the battery at an intermediate stage in the process of forming the connection; and Fig. 4 is a fragmental view illustrating the method of severing the carbon electrodes.

While the metal spraying process for forming the intercell connections may be employed with any desired type of battery, the specific construction described and illustrated herein is one in which both the battery and the cells are of rectangular shape. The battery comprises an open top, rectangular, inner casing 10 of suitable non-conductive material, such as paraffin impregnated paper or cardboard, within which is arranged in juxtaposed relationship a plurality of cells 11. Each cell comprises an open top envelope 12, which is in the general shape of a bag and is composed of a suitable non-conductive electrolyte resistant material, such as the copolymer of vinyl chloride and vinyl acetate, rubber hydrochloride, or the like. Within the envelope 12 is a negative electrode 13 composed of a suitable metal, such as zinc. Said electrode is in the general shape of a tray, having a flat main section 14 adjacent to one of the broad surfaces of the envelope 12, and two side flanges 15 and a bottom flange 16 extending substantially perpendicularly to the main section 14. An integral narrow elongated tab 17 of the metal projects upwardly from the main section 14 and forms a conductor leading to the electrode 13 and a terminal for the cell. Nesting within and against the metal electrode 13 is a separating member 18, which is composed of a sheet of bibulous non-conductive material, such as blotting paper, and is in the shape of a tray, generally similar to the shape of the negative electrode 13. Nesting within the separating member 18 is a rectangular block of active depolarizing material 20, which may be composed of a mixture of powdered manganese dioxide and carbon. Both the active body 20 and the separating member 18 are moistened with the electrolyte, which may be an aqueous solution of ammonium chloride and zinc chloride. Embedded within the active body 20 and projecting upwardly therefrom is a slender rod-shaped positive electrode 21 which may be composed of a suitable material, such as carbon. The electrode 21 forms the other conductive terminal for the cell. The elements are enclosed at the bottom and the sides by the non-conductive envelope 12, and the positive electrode 21 and the tab 17 project upwardly above the open top of the envelope.

All of the cells are of similar construction and they are arranged in the casing 10 in juxtaposed relationship and in pressure engagement with each other, whereby the elements of the individual cells are in pressure contact with each other.

A plate of conductive metal 23, which may be zinc, is inserted in the casing 10 at one end thereof, said plate 23 being of a size and shape similar to that of the main sections 14 of the metal electrodes 13, and having an elongated tab 24 similar to the tabs 17 extending upwardly therefrom. An elongated conductor 25 is connected at one end thereof, as by soldering, to the plate 23 and extends around the side and bottom of the inner casing 10 to the far end of the latter, as shown. A second conductor 22 is similarly connected to the metal electrode 13 of the cell at the other end of the battery and extends to the exterior of casing 10.

The upwardly projecting tab 17 of each of the cells 11 is bent into adjacent relationship to the positive electrode 21 of the adjacent cell and the end portion thereof is bent so as to partially overlie the top end of said positive electrode. The tabs 17 are connected to the positive electrodes 21 by masses of sprayed metal 26, as will be described more fully hereinafter, whereby the cells are connected together in series. The tab 24 of the metal plate 23 is similarly arranged and connected to the positive electrode 21 of the cell adjacent to said plate. A mass of fusible sealing composition 27 fills the open top portions of the envelopes 12 and the casing 10, and forms a seal closure for the cells and the battery.

In the construction of the battery, the cell elements are first assembled into the cell units 11, one of which is shown in Fig. 2. At this stage, the positive electrodes, 21 are longer and extend upwardly to a higher level than they do in the completed battery, as is shown in Fig. 3. The cells and the plate 23 are then placed in the casing 10, and the tab 24 of the plate 23 and the tabs 17 of the metal electrodes 13 are bent so as to extend in a generally horizontal direction into substantially contiguous relation to the positive electrodes 21 of the adjacent cells at a level below the top edge of the casing 10. The tabs 24 and 17 are then turned so that they extend upwardly in substantial contact with the positive electrodes 21 to a level somewhat above the top edge of the casing 10, as shown in Fig. 3. The positive electrodes 21 extend upwardly farther than do the tabs 24 and 17. The sealing composition 27 is then poured in place in the molten condition and allowed to cool and solidify. In the arrangement shown, the upper surface of the sealing composition 27 is at substantially the same level as the top edge of the inner casing 10. The positive electrodes 21 are then severed at substantially the top level of the sealing composition 27. This may be accomplished by any suitable method. A pair of snippers 28, as shown in Fig. 4, has been found to be suitable. The jaws 29 thereof are placed on opposite sides of the electrode 21 at the surface level of the sealing composition 27 and upon manipulation of the handles 30, either manually or by machine, the electrode 21 is severed accurately at the desired point. The severing of the electrodes 21 provides them with fresh clean end surfaces for attachment to the tabs 17.

The tabs 17 and 24 are constructed so that their width is less than the diameter of the carbon electrodes 21 and the jaws 29 of the snippers are closed only sufficiently to cut into the electrodes but not the tabs. The electrodes are brittle and are severed satisfactorily by such operation. For example, with tabs having a width of .035 inch and electrodes having a diameter of .060 inch, the severance takes place satisfactorily. With machine operation, it has been found that a row of electrodes can be severed very rapidly. If it is desired to eject the broken off end portions of the electrodes 21, this may be done in any suitable manner, as by an air blast.

The upwardly projecting portions of the tabs 17 and 24 are then bent down horizontally so as to overlie and be substantially in contact with the top end surfaces of the positive electrodes 21. This may be accomplished by drawing a blunt instrument along the top of the battery. It is desirable that the exposed surfaces of the tabs be clean so that the sprayed metal will adhere readily to them, and, in practice, an instrument having an abrasive surface, such as an emery stone, is drawn along the top surface of the battery. This accomplishes simultaneously both the bending and the cleaning of the tab ends. The bent down end portions of the tabs 24 and 17 preferably have a length less than the diameter of the electrodes 21 and only partially overlie the ends of said electrodes, whereby substantial portions of the end surfaces of the electrodes are exposed.

The tabs 24 and 17 are then connected to the electrodes 21 by spraying a molten metal against their exposed surfaces. While any suitable metal may be employed, copper has been found to give satisfactory results and is preferred. Any ordinary apparatus for spraying molten metal may be employed, and the spray is directed at an angle substantially less than 90° to the top surface of the battery. While the angle is not critical, an angle of approximately 45° has been found to give satisfactory results and is preferred. It has been found that if the spray is directed at such an inclined direction, the molten metal does not adhere to the surface of the sealing composition 27 while it does adhere to the exposed surfaces of the tabs 17 and 24 and the electrodes 21. To avoid heating the sealing composition 27 to the point where it softens and flows under the influence of the spray, the latter is directed at the same spot for only a short period of time, and several sprays are given to build up the connecting masses of metal to a suitable thickness. For the best results, the sealing composition should have a hard surface and should not have too low a softening point. It has been found that a hard sealing wax composed of approximately three parts by weight of gum rosin and two parts of a filler such as powdered silica is quite satisfactory, having a hard smooth surface and a softening point higher than 150° F.

In practice, the spray is applied continuously and is moved across the top surface of the battery. It is usually necessary to do this several times to build up the metal to the desired thickness. The spray is preferably applied from a different direction during each movement across the battery. For example, while maintaining the direction of the spray substantially constant, the battery may be sprayed once, then turned horizontally through an angle of 90° and given a second spray, and this operation may be repeated until the battery has been sprayed from four different directions. For the economical operation of the process, a number of the battery units may be arranged together upon a platform or in a jig, and the platform or jig may be turned between successive spraying operations until the batteries have been sprayed from four different directions. In this manner, a connecting mass 26 of metal having substantial thickness is built up upon the contiguous exposed portions of the tabs 17 and 24 and the electrodes 21, which mass adheres firmly to said members and forms conducting bridges upon the exposed surfaces of said members. At the same time, the molten metal does not adhere to the top surface of the sealing composition 27, or to any other surface where its presence is not desired. With a small amount of practice, an operator soon becomes proficient in the rapid formation of satisfactory connections.

The process has the primary advantage that it can be carried out very rapidly. In addition, it makes possible economies in construction. For example, in most battery constructions employing carbon rod electrodes, the carbon rods are provided with conductive metal caps which fit tightly over the top ends thereof. When the sprayed metal connections of the present invention are used, such metal caps may be dispensed with. In addition, the solder and soldering operations previously employed are dispensed with, along with the necessity for selecting an active and non-corrosive soldering flux. The latter has always represented a serious problem. The use of tin, which is a scarce and sometimes difficultly obtainable constituent of the solder, is also avoided. Also, the process provides clean and easily accessible contacts for testing the cells individually after the battery has been assembled. Also, the process is adapted for rapid machine operation.

After the battery has been formed as described, it may, if desired, be dipped in a body of molten non-conductive composition such as wax or pitch, so as to cover the exposed connections 26 and form a thin insulating coating over the entire battery, including the casing 10. A support 35 for the battery terminals, composed of a number of layers of non-conductive material as shown, may be arranged at one end of the battery, and one terminal 36 carried thereby may be connected to the conductor 25, and the other terminal 37 carried thereby may be connected to the conductor 22. Said connections may be made by means of solder or other suitable means. The whole is then enclosed in an outer carton 38 of suitable non-conductive composition, such as paperboard, which has an opening 39 at an end thereof to provide access to the terminal member 35.

While but a single modification of the invention has been described and illustrated, this is by way of example and various modifications may be made within the scope of the invention as the same is set forth in the appended claims. For example, instead of spraying against the entire top surface of the battery, a stencil sheet of metal or other suitable composition may be placed over the top of the battery, such sheet having openings registering with the positive electrodes 21. The metal spray may then be directed through the openings to form the connecting masses 26. In such case, the spray may be directed vertically downward upon the battery.

Also, instead of employing the tabs 17 which are integral with the metal electrodes 13, separate conductors such as wires may be employed, said wires being conductively connected, as by soldering, to the metal electrodes 13 and disposed in substantially the same arrangement as are the tabs 17 and connected to the electrodes 21 by a spraying operation as described. Such separate wire type of connections may be used to advantage where the ordinary cylindrical type of dry cell having a cup-shaped metal electrode is used.

What is claimed is:

1. In making a battery of electrically connected cells each having a slender carbon terminal and a flexible metal terminal projecting from the same side of said battery, the steps which comprise applying a layer of sealing compound to said side of said battery in such manner as to leave the end portions of said terminals exposed, bending the flexible terminal of one cell into contiguous and partially overlying relationship to the end of the slender carbon terminal of a different cell, and spraying molten metal upon said contiguous portions of said terminals whereby said sprayed metal upon solidifying forms conductive connections between said contiguous terminals.

2. In making a battery of electrically connected cells each having a slender carbon terminal and a flexible metal terminal projecting from the same side of said battery, the steps which comprise applying a layer of sealing compound to said side of said battery in such manner as to leave the end portions of said terminals exposed, severing the exposed portions of said carbon terminals to provide clean ends for said carbon terminals, bending the flexible terminal of one cell into contiguous and partially overlying relationship to the end of the slender carbon terminal of a different cell, and spraying molten metal upon said contiguous portions of said terminals whereby said sprayed metal upon solidifying forms conductive connections between said contiguous terminals.

3. In making a battery of electrically connected cells each having a slender carbon terminal and a flexible metal terminal projecting from the same side of said battery, the steps which comprise applying a layer of sealing compound to said side of said battery in such manner as to leave the end portions of said terminals exposed, bending the flexible terminal of one cell into contiguous and partially overlying relationship to the end of the slender carbon terminal of a different cell, and spraying molten metal upon said contiguous portions of said terminals while directing said spray at an angle substantially less than 90 degrees to the exposed surface of said sealing layer, whereby said sprayed metal upon solidifying forms conductive connections between said contiguous terminals.

4. In making a battery of electrically connected cells each having a slender carbon terminal and a flexible metal terminal projecting from the same side of said battery, the steps which comprise applying a layer of sealing compound to said side of said battery in such manner as to leave the end portions of said terminals exposed, bending the flexible terminal of one cell into contiguous and partially overlying relationship to the end of the slender carbon terminal of a different cell, and spraying molten copper upon said contiguous portions of said terminals while directing said spray at an angle substantially less than 90 degrees to the exposed surface of said sealing layer, whereby said sprayed metal upon solidifying forms conductive connections between said contiguous terminals.

ERNEST F. STEINHOFF.

REFERENCES CITED

The following references are of record in the file of this patent:

UNITED STATES PATENTS

| Number | Name | Date |
| --- | --- | --- |
| 1,639,280 | Benner et al. | Aug. 16, 1927 |
| 1,670,040 | McCabe | May 15, 1928 |
| 1,723,727 | Eckstein | Aug. 6, 1929 |
| 1,758,362 | Gillingham | May 13, 1930 |
| 1,984,925 | Gahn | Dec. 18, 1934 |
| 2,361,378 | Brennan | Oct. 31, 1944 |

FOREIGN PATENTS

| Number | Country | Date |
| --- | --- | --- |
| 255,967 | Great Britain | Aug. 5, 1926 |
| 313,154 | Germany | June 27, 1919 |

OTHER REFERENCES

Cook, V. A.: Mogul Metallizer, Sept.-Oct. 1944, page 6.